United States Patent Office 3,550,434
Patented Dec. 29, 1970

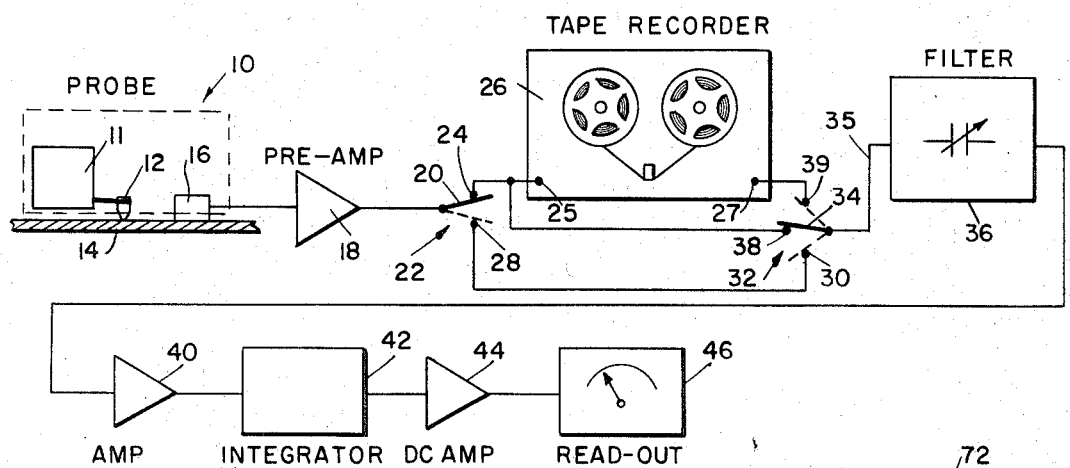
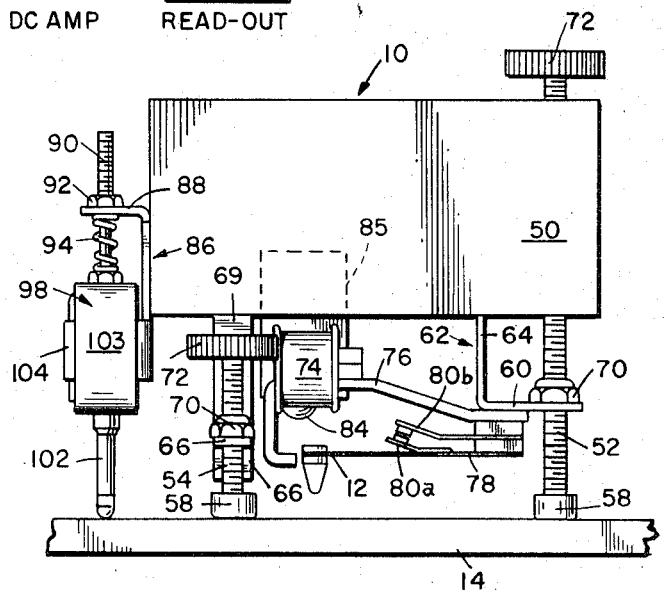
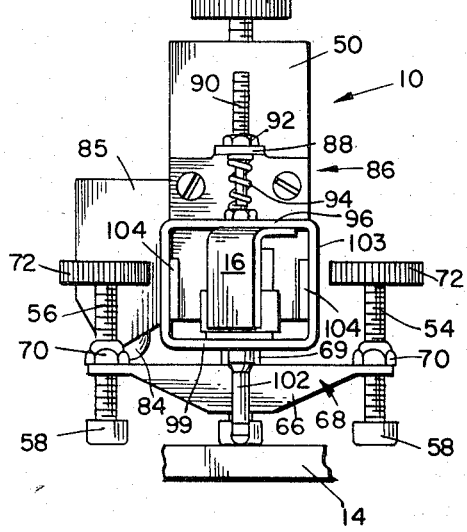

3,550,434
FLAW DETECTION SYSTEM AND PROBE
Rudi M. Schroeer, Enon, Thomas A. Garmhausen, Medway, and Johann E. Frank, Yellow Springs, Ohio, assignors to Arvin Systems, Inc., Dayton, Ohio, a corporation of Ohio
Filed Jan. 11, 1968, Ser. No. 697,101
Int. Cl. G01n 29/04
U.S. Cl. 73—67.2                                13 Claims

ABSTRACT OF THE DISCLOSURE

A system for detecting flaws in a workpiece. The system includes a probe for imparting shocks to a workpiece and detecting the vibrations caused by the shocks. When a flaw exists, it causes under-damped vibrations at particular frequencies. The vibrations are detected and converted into electrical signals which are coupled through a narrow-band filter for selecting only the under-damped vibrational signals. Said signals are coupled to an integrator which provides a D.C. voltage to a meter which in turn providing a reading indicating the presence or absence of a flaw. The probe comprises a D.C. vibrator having a striker engageable with the workpiece, and an accelerometer also engageable with the workpiece for receiving the vibrations in the workpiece which are created by shocks imparted by the striker and transducing them into electrical signals fed to said filter.

---

In mechanical structures, particularly those having riveted or welded connections between elements, it is sometimes necessary to determine whether flaws such as tiny crack exist at the connections. Presently, it is common practice to use ultrasonic frequency apparatus in testing such structures for flaws. Certain difficulties present themselves when ultrasonic apparatus is used, however, in that the vibrations of the ultrasonic source must be injected into the structure at a critical angle. Similarly, the pick up device must be positioned at a particular angle and in a particular location to detect the location of a flaw in the structure. Furthermore, the signals which are picked up are usually displaced on an oscilloscope and their interpretation requires a great deal of expertise.

It has been discovered, however, that certain vibrational frequencies, excited by mechanical shocks imparted at an audio frequency, remain under-damped when a flaw is present. Therefore, it is an object of the present invention to provide a flaw detection system which can be operated in the audio frequency range to supply a series of shocks to a workpiece while detecting its resultant vibrations and processing them to obtain an easily read D.C. meter indication of the presence or absence of any flaws in said workpiece.

SUMMARY OF THE INVENTION

In accordance with the invention there is provided a probe having means for applying shocks to a workpiece at an audio frequency rate and a detector for detecting the vibrations on the workpiece caused by said shocks. The output of the vibration detector is coupled through a filter which passes only the narrow band of signal frequencies which exist in an under-damped condition when there is a flaw. The output signal from the filter is integrated, amplified, and applied to a D.C. meter which indicates whether a flaw exists.

The probe comprises a housing supported on a plurality of legs and having a pulse generator, a vibration transducer, and a pulse rate monitor mounted therein. The pulse generator comprises a D.C. vibrator having a striker attached thereto for applying the mechanical shocks to the workpiece. One of the housing legs is adjustable for controlling the throw of the striker against the workpiece and thus the frequency of its shocks imparted to the workpiece. This shock frequency is correlated with the pulse rate monitor which comprises a neon bulb connected to flash at the proper frequency of movement of the striker as determined by empirical data. Thus, said one leg is adjusted to "stop" movement of the striker under the light of the flashing neon bulb.

The other of the housing legs are disposed adjacent the vibration transducer which comprises an accelerometer engageable with the workpiece for receiving the vibrations in the workpiece and transducing them into electrical signals. The accelerometer is connected to the housing through a spring, and its pressure against the workpiece can be controlled by adjustment of the other probe legs.

The vibration frequencies which are under-damped due to flaws in the workpiece are predetermined by empirical data. A band-pass filter, connected to the accelerometer output, passes only the frequencies which are near these under-damped frequencies. The output of the filter is coupled through an integrator to a D.C. meter which indicates the presence or absence of the under-damped signal, thereby indicating the presence or absence of a flaw.

Conveniently, a tape recorder can be connected between the accelerometer and the filter to record the vibrations of the workpiece for subsequent study and comparison.

BRIEF DESCRIPTION OF THE DRAWINGS

The accompanying drawings illustrate the invention. In such drawings:

FIG. 1 is a block diagram of a flaw detecting system embodying the invention;

FIG. 2 is a side elevation of the probe illustrated in FIG. 1, and

FIG. 3 is a front elevation of the probe shown in FIG. 2.

DETAILED DESCRIPTION OF THE PREFERRED EMBODIMENT

The flaw detection system shown in FIG. 1 as embodying the invention includes a probe 10 having a mechanical pulse generator 11. The generator is provided with a striker 12 adapted to impart shocks to a mechanical assembly or workpiece 14. An accelerometer 16 on the probe engages the workpiece 14 and receives or detects all of the vibrations therein caused by the shocks from the striker 12, the presence of a flaw in the workpiece creating vibration frequencies picked up by the accelerometer many times greater than the vibration frequencies imparting to the workpiece by the striker. The accelerometer 16 acts as a transducer by converting these vibrations into electrical signals which are fed to a preamplifier 18. The amplified vibration signals are connected from the preamplifier 18 to the arm 20 of a two-position switch 22. One contact 24 of the switch 22 is connected to the 22. One contact 24 of the switch 22 is connected to the "record" input 25 of a tape recorder 26, and the other contact 28 of the switch 22 is connected to one contact 30 of a three-position switch 32. The arm 34 of switch 32 is connected to the input lead 35 of a filter 36, while the other contacts 38 and 39 of said switch are respectively connected to contact 24 on switch 22 and to the "play" output 27 of the tape recorder 26. Thus, the switches 22 and 32 permit the accelerometer signals to be coupled only to the filter, only to the tape recorder, or simultaneously to the tape recorder and the filter. The switches also permit an operator to couple the filter input only to the "play" output 27 of the tape recorder.

The filter is designed to have a band-pass which includes only the band of frequencies which are known to be underdamped when a flaw exists in the type of workpiece under test. These frequencies are predetermined by empirical data gathered on various workpieces. The filters may be variable, or they may be in the form of plug-in units designed for a particular type of workpiece. The output lead 37 of the filter 36 is applied to an amplifier 40 which amplifies and couples the signal to an integrator circuit 42 where the alternating signal produced by the accelerometer is converted to a D.C. signal. The output of the integrator circuit 42 is connected to a D.C. meter 46 which indicates a flaw when the D.C. voltage goes above a particular level.

Since the end result of the system is a reading on a D.C. meter, no skill or expertise is required of the operator as compared to a system requiring an oscilloscope read out. Said D.C. meter reading is made possible in this invention because of the discovery that under-damped frequencies exist when a defective structural connection is mechanically pulsed at a low frequency; and because of the combination of the integrator 42, the filter 36, and the probe 10.

This system has been found to be very accurate, for example, in detecting cracks as small as .05 inch in a ⅜ inch plate. Various applications to which the apparatus of the invention may be applied include detecting cracks under fastener heads such as rivets and screws, testing honeycomb structures for poor bonds, testing turbine discs for cracks, and the like.

As shown in FIGS. 2 and 3, the probe 10 has a housing 50 which is supported on the workpiece 14 by a rear leg 52 and a pair of forward legs 54 and 56. Rubber feet 58 are attached to the lower ends of the legs to cushion the probe and prevent vibrations from being transmitted to the workpiece 14 through the legs. The legs are adjustable and are formed by screws threaded through brackets on the housing. As shown in FIG. 2, the leg 52 extends through the rear of the housing 50 and through threaded holes in the horizontal arm 60 of an L-shaped bracket 62 which has its vertical arm 64 connected to the underside of the housing. As shown in FIG. 3, the forward legs 54 and 56 extend through threaded holes in the transverse horizontal arm 66 of an inverted T-shaped bracket 68 whose vertical arm 69 is connected to the underside of the forward end of the housing. Locknuts 70 are provided on each of the legs to secure them in the desired position of adjustment, and each leg has a knurled head 72 at its upper end for adjusting the legs with respect to the housing.

The pulse generator 11 comprises a D.C. vibrator having its coil 74 wound on one leg of a yoke 76 connected to the L-shaped bracket 62. The striker 12 projects outwardly from one end of a vibrator leaf 78 connected to the yoke 76. The leaf 78 is provided with a contact 80a which cooperates with a contact 80b on the yoke 76 to make and break the coil circuit. Thus, when a D.C. voltage is applied to the coil of the vibrator, a magnetic field is set up which causes the vibrator leaf 78 to deflect. The coil circuit is opened and closed by the contacts 80a and 80b as the leaf 78 deflects up and down, thereby vibrating the striker 12 against the workpiece 14. As will be understood, as the rear leg 52 is adjusted upwardly and downwardly with respect to the housing, the throw of the striker is changed to adjust the frequency of the pulse generator and the frequency of the impulses imparted to the workpiece by the striker.

As shown in FIG. 3, a pulse rate monitor is mounted on the side of the housing and comprises a neon bulb 84 located adjacent the striker 12. The bulb 84 is connected to a variable frequency oscillator 85 which may be adjusted over the desired ranges of frequencies for the pulse generator. The pulse rate monitor acts as a stroboscope, and thus the oscillator is set to the desired pulse generator frequency and the leg 52 is adjusted until vibratory motion of the striker 12 coincides with the flashing of the neon bulb 84.

The accelerometer 16, which serves as a vibration-to-voltage transducer, is mounted on the forward end of the housing 50. As shown in FIGS. 2 and 3, a mounting bracket 86 having a forwardly projecting lip 88 is mounted on the front housing face. Said lip is provided with a threaded opening for the reception of a screw 90 having a locknut 92 thereon for releasably locking said screw in the desired position with respect to the lip 88. A coil spring 94 is connected to the lower end of the screw 90 and to the upper wall 96 of a rectangular bracket 98. The accelerometer 16 is fixedly mounted within the bracket 98 and is provided with a probe 102 projecting downwardly through the bottom wall 99 of said bracket. The probe 102 is biased downwardly by the spring 94 into engagement with the workpiece 14 to receive the vibrations created therein by the striker 12. A pair of guide fingers 104 project outwardly from the mounting bracket 86 in sliding engagement with the side walls 103 of bracket 98 to guide the reciprocating movements of the accelerometer.

Thus, the spring connection 94 between the brackets 86 and 98 isolates the accelerometer from vibrations in the housing 50 while biasing the accelerometer toward the workpiece and permitting its reciprocal vertical movement. As will be understood, the pressure of the accelerometer probe 102 against the workpiece can be adjusted by adjustment of the screw 90 and by adjustment of the legs 54 and 56 with respect to the housing. The adjustability of the legs 52, 54, and 56 also permits the legs to uniformly engage the surfaces of workpieces having irregular contours.

In operation of the probe, the striker 12 is vibrated against the workpiece to set up vibrations therein. The frequency of the shocks imparted to the workpiece being adjusted by adjustment of the leg 52 until the striker vibration coincide with the flashes of the neon bulb 84. The probe 102, whose pressure against the workpiece is adjusted by adjustment of the legs 54 and 56 and/or the screw 90, receives the vibrations created in the workpiece and said vibrations which are transduced into electrical signals by the accelerometer 16 are transmitted to the indicating circuit assembly shown in FIG. 1 for detecting the presence or absence of a flaw in the workpiece.

We claim:

1. A system for detecting flaws in a workpiece, comprising first means for imparting mechanical shocks to a workpiece, second means engageable with said workpiece to detect vibrations therein caused by said first means and transducing said vibrations into electrical signals, means for adjusting the contact of said first and second means with said workpiece, a band-pass filter having an input coupled to said second means and having an output limited to a band of frequencies which are produced due to flaws in the workpiece, and a meter coupled to the output of said filter for indicating the presence of those signals which are produced due to flaws in the workpiece.

2. The invention as set forth in claim 1 with the addition that an integrator circuit is coupled between said filter and meter for converting the signals from the filter into D.C. signals.

3. The invention as set forth in claim 1 with the addition that signal recording means is connected to said system with its input and output terminals coupled respectively to said second means and said filter input.

4. The invention as set forth in claim 1 with the addition that means are provided for adjusting the frequency of the mechanical shocks imparted to the workpiece by said first means.

5. The invention as set forth in claim 1 with the addition that means are provided for monitoring the frequency of the mechanical shocks imparted to the workpiece by said first means.

6. The invention as set forth in claim 1 with the addition that means are provided for monitoring the frequency of the mechanical shocks imparted to the workpiece by said first means, and means are provided for adjusting the frequency of said shocks.

7. A probe for detecting flaws in a workpiece, comprising a housing supported on a plurality of legs, a pulse generator mounted on said housing and having a striker engageable with said workpiece for imparting shocks thereto, an accelerometer mounted on said housing and engageable with said workpiece to detect vibrations therein resulting from said shocks, and biasing means acting between said housing and accelerometer.

8. The invention as set forth in claim 7 in which said pulse generator comprises an electrically operated vibrator having said striker connected to its movable element.

9. The invention as set forth in claim 7 with the addition that a stroboscopic monitor for monitoring the frequency of the striker is mounted on said housing, said monitor comprising a light bulb disposed adjacent said striker and connected to an oscillator.

10. The invention as set forth in claim 7 in which each of said legs is provided with a resilient foot.

11. A probe for detecting flaws in a workpiece, comprising a housing supported on a plurality of legs, a pulse generator mounted on said housing and having a striker engageable with said workpiece for imparting shocks thereto, an accelerometer mounted on said housing and engageable with said workpiece to detect vibrations therein resulting from said shocks, said legs being adjustably connected to said housing for adjustably moving said striker and accelerometer toward and away from said workpiece.

12. A probe for detecting flaws in a workpiece comprising a housing supported on a plurality of legs, a pulse generator mounted on said housing and having a striker engageable with said workpiece for imparting shocks thereto, a first bracket mounted on said housing and having a screw adjustably carried therein, a spring connected to said screw, a second bracket connected to said spring and slidably carried on said first bracket, and an accelerometer mounted on said second bracket and engageable with said workpiece to detect vibrations therein resulting from said shocks.

13. The invention as set forth in claim 12 in which said legs and screw are adjustably movable with respect to said housing for adjusting the positioning of said accelerometer and striker with respect to said workpiece.

References Cited
UNITED STATES PATENTS

| | | | |
|---|---|---|---|
| 2,043,484 | 6/1936 | Miller | 356—23 |
| 3,106,838 | 10/1963 | Crooks | 73—67.2 |
| 3,180,136 | 4/1965 | Foster | 73—71.4 |

JERRY W. MYRACLE, Primary Examiner

U.S. Cl. X.R.

73—71.4

PO-1050
(5/69)

UNITED STATES PATENT OFFICE
CERTIFICATE OF CORRECTION

Patent No. 3,550,434     Dated December 29, 1970

Inventor(s) Rudi M. Schroeer, Thomas A. Garmhausen & Johann E. Fr

It is certified that error appears in the above-identified patent and that said Letters Patent are hereby corrected as shown below:

In the drawing, in the title of the invention, "FLOW" should read -- FLAW -- .

Column 1, line 22, "providing" should read -- provides -- .
    Column 1, line 34, "crack" should read -- cracks --
    Column 1, line 44, "displaced" should read -- displayed -- .
    Column 3, line 29, "honecomb" should read -- honeycomb -- .
    Column 3, line 39, after "threaded" insert -- a -- .
    Column 3, line 40, "holes" should read -- hole -- .

Signed and sealed this 18th day of May 1971.

(SEAL)
Attest:

EDWARD M. FLETCHER, JR.               WILLIAM E. SCHUYLER, JR.
Attesting Officer                      Commissioner of Patents